United States Patent
Neugebauer et al.

(10) Patent No.: US 9,206,333 B2
(45) Date of Patent: *Dec. 8, 2015

(54) BINDING AGENT FOR PRODUCING ROAD MARKINGS READY QUICKLY FOR TRAFFIC

(71) Applicant: Evonik Roehm GmbH, Darmstadt (DE)

(72) Inventors: Peter Neugebauer, Limburg (DE); Heike Heeb, Erlensee (DE); Ingrid Kizewski, Hanau (DE)

(73) Assignee: EVONIK ROEHM GmbH, Darmstadt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/301,028

(22) Filed: Jun. 10, 2014

(65) Prior Publication Data

US 2014/0295074 A1   Oct. 2, 2014

Related U.S. Application Data

(62) Division of application No. 13/384,063, filed as application No. PCT/EP2010/059381 on Jul. 1, 2010.

(30) Foreign Application Priority Data

Jul. 16, 2009   (DE) .......................... 10 2009 027 767

(51) Int. Cl.
  *C09D 175/16*   (2006.01)
  *C08F 220/18*   (2006.01)
  *C08G 18/67*    (2006.01)
  *C08G 18/75*    (2006.01)
  *C08F 222/10*   (2006.01)
  *C08K 3/22*     (2006.01)
  *C08K 3/26*     (2006.01)

(52) U.S. Cl.
  CPC ............ *C09D 175/16* (2013.01); *C08F 220/18* (2013.01); *C08G 18/672* (2013.01); *C08G 18/755* (2013.01); *C08F 222/1006* (2013.01); *C08K 3/22* (2013.01); *C08K 3/26* (2013.01); *C08K 2003/2241* (2013.01); *C08K 2003/265* (2013.01)

(58) Field of Classification Search
  CPC ............... C09D 175/16; C08F 220/18; C08F 222/1006; C08G 18/672; C08G 18/755; C08G 18/48; C08K 3/22; C08K 3/26; C08K 2003/265; C08K 2003/2241
  See application file for complete search history.

(56) References Cited

U.S. PATENT DOCUMENTS

| 6,509,086 B1 * | 1/2003 | Schroder ................ B32B 27/30 428/212 |
| 6,699,544 B2 | 3/2004 | Schoela et al. |
| 2003/0021961 A1 | 1/2003 | Ylitalo et al. |
| 2003/0099819 A1 | 5/2003 | Schroder et al. |
| 2004/0253383 A1 | 12/2004 | Belik et al. |
| 2009/0253845 A1 | 10/2009 | Neugebauer et al. |
| 2012/0107493 A1 * | 5/2012 | Neugebauer et al. ......... 427/137 |
| 2012/0171492 A1 | 7/2012 | Muehlbach et al. |
| 2013/0289164 A1 | 10/2013 | Hilf et al. |
| 2014/0128536 A1 | 5/2014 | Hilf et al. |

FOREIGN PATENT DOCUMENTS

| CA | 266096 | 11/1926 | |
| DE | 2660096 A1 * | 2/2008 | ............... C09D 4/06 |
| JP | 2002-220553 | 8/2002 | |
| WO | 02 085638 | 10/2002 | |
| WO | 2008 022861 | 2/2008 | |

OTHER PUBLICATIONS

International Search Report Issued Sep. 1, 2010 in PCT/EP10/59381 Filed Jul. 1, 2010.
European Search Report issued Jul. 9, 2015, in European Patent Application No. 10731499.9.

* cited by examiner

*Primary Examiner* — Satya Sastri
(74) *Attorney, Agent, or Firm* — Oblon, McClelland, Maier & Neustadt, L.L.P.

(57) ABSTRACT

A method of producing a trafficway marking, the method including applying a cold plastic to a trafficway surface, to obtain the trafficway marking, where, in less than 5 minutes after the applying, the trafficway marking can withstand the passage of traffic, and where the cold plastic includes from 15% to 45% by weight of a reactive resin; from 1% to 5% by weight of a mixture comprising an initiator; from 7% to 15% by weight of an inorganic pigment; and from 50% to 60% by weight of a mineral filler.

8 Claims, No Drawings

BINDING AGENT FOR PRODUCING ROAD MARKINGS READY QUICKLY FOR TRAFFIC

CROSS REFERENCE TO RELATED APPLICATION

This application is a divisional of U.S. application Ser. No. 13/384,063, filed on Jan. 13, 2012, which is a 371 of PCT/EP2010/059381, filed on Jul. 1, 2010, and claims priority to German Patent Application No. 10 2009 027 767.6, filed on Jul. 16, 2009.

FIELD OF THE INVENTION

The present invention comprises a novel formulation for the marking of trafficways, such as roads; the waiting time after application, before traffic can resume passage over this formulation, has been reduced in comparison with the prior art.

Modern trafficway markings are subject to many requirements. Firstly, these systems are expected to be easy to apply on the road surface and at the same time to have good shelf life, and also to provide a long lifetime of the marking. Other important factors are speed of use, and in particular that traffic can rapidly resume passage over the marked trafficway surface. For reasons related to infrastructure, it is very important that road sections affected by marking operations can be released very rapidly for resumption of traffic. In order to avoid damage to, or indeed destruction of, the marking by premature passage of traffic, trafficway marking operations require that traffic is prevented from entering the section to be marked until complete drying or hardening of the marking material and/or of its adhesive has taken place. When traffic is prevented from entering a section of trafficway, the results include not only undesired delays and costs associated therewith but also an increased risk of accident.

The interval between application of marking compositions of the prior art to the trafficway surface and suitability for resumption of passage of traffic depends very greatly on the ambient temperature and the nature of the trafficway surface. Said interval is at least 5 min. However, it can also amount to over 15 min. This waiting time causes delay to road traffic, with resultant considerable inconvenience for drivers and risk of accidents; the producers and users of trafficway markings are seeking wherever possible to keep these to a minimum.

PRIOR ART

For quite some time, development work has been aimed at reducing the waiting time between application of a trafficway marking and suitability for passage of traffic. Examples of systems currently used as trafficway marking materials are solvent-based paints, water-based paints, thermoplastic paints, paints based on reactive resins, and also prefabricated adhesive tapes. A disadvantage of the latter is that they are complicated to produce and to apply. Another factor, taking into account the desired long life of the marking, is a restricted amount of freedom in relation to the design of the marking, e.g. using glass beads.

A known solution applies a relatively large amount of glass beads to the trafficway marking in order to form an insulating film and to allow practically immediate passage of traffic over the trafficway marking. However, this technique is unsatisfactory firstly because it requires that the amount of the trafficway marking applied is relatively small in relation to the amount of the glass beads applied, with resultant potential wear problems, and secondly because considerable amounts of glass beads are lost on the trafficway. The primary purpose of incorporating glass beads into the trafficway marking is to improve reflection.

A known solution is application from solutions in volatile, organic solvents, the drying of which is relatively rapid because of relatively low density. However, this type of system can naturally only give particularly thin layers, and these firstly restrict freedom of formulation, for example incorporation of glass beads, and secondly severely restrict lifetime. If particularly volatile solvents are used, e.g. acetone, volatile ketone derivatives, toluene, or acetates, there are also increased health risks for the user. Escape of organic solvents through evaporation in the course of merely superficial drying is moreover disadvantageous for the environment and also for the quality of the marking. Skinning results in incomplete drying in the interior of the coating, with resultant risks in terms of loss of adhesion, reduced cohesion, deformation, or inadequate binding of glass beads into the material. The only available possibility is therefore to use fewer glass beads, or to accept a less advantageous ratio using a higher proportion of glass beads. However, this in turn results in potential wear problems. Aqueous systems, for example as described in EP 1 505 127, are in particular highly disadvantageous in terms of drying speed.

These systems have all of the disadvantages described for the solvent-based systems with the exception of the toxicological aspects. The drying time of this type of system is moreover significantly longer.

Thermoplastic coatings which are applied in the molten state to the trafficway surface can per se also be optimized to give high hardening rate and therefore rapidly to withstand passage of traffic. Use of these has the great disadvantage of an additional step in the process, in that the product first has to be melted, e.g. at 200° C., before it can be applied. Not only is this potentially dangerous because of the high temperature, but thermoplastic systems per se have relatively high susceptibility to abrasion and relatively low heat resistance. Thermoplastic systems often have significantly shorter lifetimes than systems based, for example, on reactive resins and involving crosslinking reactions.

One approach to acceleration of the hardening of reactive resin systems uses unsaturated polyesters in the resin systems, as described for example in EP 0 871 678. EP 0 871 676 describes the transfer of the same unsaturated bicyclic groups having a proton which is also easy to abstract, from the polyesters to other polymers, such as polyolefins or else polymethacrylates. However the results in all cases show that very rapid skinning occurs after application, while the actual hardening even of layers of just a few centimeters' thickness requires hours, and a trafficway marking comprising these polymers cannot therefore rapidly withstand passage of traffic.

WO 98/40424 proposes 2- and 3-component formulations based on unsaturated polyesters in unsaturated ethylenic compounds, or based on methacrylic polymers in metharylic monomers, where these are hardened with a mixture made of a chlorinated dibenzoyl peroxide and dibenzoyl peroxide in the presence of tertiary aromatic amines. The particularly rapid hardening of the formulations known per se is attributed to the combination of the two initiators. A disadvantage here is that it is essential to use halogen-containing, more precisely chlorine-containing, compounds, and these always have the attendant risk that subsequent degradation will release toxicologically hazardous organohalogen degradation products, or more precisely chlorinated aromatic degradation products.

Other disadvantages are the narrow temperature range within which these formulations exhibit their speed of action, and poor UV resistance of the unsaturated ethylenic compounds. None of the abovementioned solutions for reducing the waiting time prior to resumption of road traffic on a freshly marked road is therefore satisfactory: either in relation to the health and safety of the producers and users of the trafficway marking composition or for the environment, the durability of the trafficway marking, and the visibility of the trafficway marking during the day and at night.

OBJECTIVE

It is an object of the present invention to provide a new formulation which can mark trafficway surfaces and which comprises a reactive resin which hardens more rapidly than, or at least just as rapidly as, the prior art, and which allows the marking rapidly to withstand passage of traffic less than 5 min. after application to the trafficway surface. The intention is to achieve this within the range from 5° C. to 50° C., irrespective of the ambient temperature.

A particular object consists in providing a reactive resin which can give trafficway markings that have longer lifetime than, or at least the same lifetime as, the prior art, where the markings provide good retroreflective properties, good daytime and nighttime visibility, high, stable whiteness, and good grip, even when the trafficway is wet.

Another object consists in the intention that the interval between application on the trafficway surface and suitability to withstand passage of traffic is to be less than 5 min., preferably less than 2 min., irrespective of the application thickness, which is intended to be from 400 µm to 2000 µm. The intention here is that the newly applied trafficway marking immediately provides grip corresponding to the prior art.

Another object consists in provision of a reactive resin for trafficway markings that rapidly withstand passage of traffic, where the resin is less critical than the prior art in relation to toxicological and environmental aspects.

Another object consists in providing a two-component system for use as trafficway marking, where the system is intended to be versatile and capable of flexible formulation, and to have relatively long shelf life.

Other objects not explicitly mentioned are apparent from the entire context of the description, embodiments, and examples hereinafter.

ACHIEVEMENT OF OBJECT

The objects are achieved via the provision of a novel trafficway marking system, or more precisely via the provision of a novel flexible sprayable cold plastic based on (meth)acrylate.

In particular, the provision of a novel reactive resin which is used as main constituent of the sprayable cold plastic, and which has the following constitution, achieves the objects, where these are that hardening rate is greater than that of, or at least comparable with that, of the prior art, and/or that suitability to withstand passage of traffic is achieved more rapidly than in the prior art, or at least at a rate comparable with the prior art, while optical properties, such as whiteness, daytime and/or nighttime visibility, and reflection properties are also very good, and lifetime is long:
  from 20% by weight to 30% by weight of crosslinking agents, preferably selected from the group of the dimethacrylates,
  from 30% by weight to 40% by weight of monomers, preferably (meth)acrylates and/or components copolymerizable with (meth)acrylates,
  from 10% by weight to 20% by weight of urethane (meth)acrylates,
  from 15% by weight to 25% by weight of prepolymers, and
  from 0% by weight to 5% by weight of accelerators.

Further auxiliaries can moreover also be present, examples being stabilizers, inhibitors, chain transfer agents and waxes.

These reactive resins are used as a basis for producing formulations which make up one of optionally two to three components of the entire sprayable cold plastic. In the invention, these formulations comprise the following components:
  from 15% by weight to 45% by weight of the reactive resin of the invention,
  from 1% by weight to 5% by weight of a mixture comprising one or more initiators,
  from 7% by weight to 15% by weight of an inorganic pigment, preferably titanium dioxide, and
  from 50% by weight to 60% by weight of further mineral fillers.

Surprisingly, it has been found that a trafficway marking obtainable via application of a cold plastic comprising a reactive resin of the invention hardens rapidly and after as little as 5 min. and preferably after 2 min. has the necessary strength, substrate adhesion, dimensional stability, and abrasion resistance to permit resumption of traffic passage thereover. This means, in the road traffic application, that when the system of the invention is used there is then no need for any complicated and lengthy exclusion of traffic from the trafficway section to be marked.

Surprisingly, it has also been found that said short initial hardening time required before the trafficway marking withstands passage of traffic is independent of temperature within the temperature range relevant for the application: from 5° C. to 50° C., preferably from 1° C. to 60° C.

The expression "suitability to withstand passage of traffic" and the synonymous expression "suitability for resumption of passage of traffic" imply that load is applied to the trafficway marking, by way of example taking the form of passage of vehicle traffic over the marking. The interval required to achieve suitability to withstand passage of traffic is the interval between the application of the trafficway marking and the juncture at which it becomes impossible to discern any alterations in the form of any abrasion, any loss of adhesion to the trafficway surface or to the embedded glass beads, or any deformation of the marking. Dimensional stability and adhesion stability are measured to DIN EN 1542 99 in association with DAfStb-RiLi 01.

Furthermore, it has surprisingly also been found that said short initial hardening time required to achieve suitability to withstand passage of traffic over the trafficway marking is independent of the applied thickness in the range from 400 µm to 2000 µm. The applied thickness of the cold plastic of the invention is from 400 µm to 2000 µm, preferably from 500 µm to 1000 µm, and particularly preferably from 600 µm to 800 µm.

Said component can also comprise further auxiliaries, such as wetting agents and/or dispersing agents, a grip-promoting (antislip) filler, and antisettling agents. Said component of the cold plastic can also itself comprise the glass beads which are added in order to improve reflection.

As an alternative, these can also be a constituent of the second component, and it is preferable, given an appropriate mechanism of application of the trafficway marking, that the glass beads are applied as third component. In this procedure, for example applied with modern marking vehicles using a second nozzle, the beads are sprayed onto the first two components directly after these have been applied. An advantage of this procedure is that the proportion of the glass beads wetted by the constituents of the other two components is only the portion embedded into the marking matrix, and ideal reflection properties are obtained. However, when this technology is applied it is very particularly important to obtain particularly good embedment of the glass beads and correspondingly good adhesion of the marking matrix and/or of the trafficway marking formulation at the surface of the glass beads. Surprisingly, it has been found that the reactive resin of the invention and/or the sprayable cold plastic of the invention comprising said reactive resin complies with these required properties at least at the level of the prior art. The properties required from a road marking are controlled in detail by DIN EN 1436.

In order to achieve a further improvement in the required properties, the glass beads can be applied together with coupling agents or can be pretreated with these. The retroreflective properties and the daytime and/or nighttime visibility of the cold plastic of the invention are then at least comparable with the prior art. Corresponding considerations apply to lifetime, in particular in relation to the embedment of the glass beads.

The second component of the cold plastic comprises the initiator. Particular polymerization initiators used are peroxides or azo compounds. It can sometimes be advantageous to use a mixture of various initiators. It is preferable to use, as free-radical initiator, halogen-free peroxides, such as dilauroyl peroxide, dibenzoyl peroxide, tert-butyl peroctoate, di(tert-butyl)peroxide (DTBP), di(tert-amyl)peroxide (DTAP), tert-butylperoxy(2-ethyl-hexyl)carbonate (TB-PEHC), and other peroxides that decompose at high temperature. Particular preference is given to dilauroyl peroxide or dibenzoyl peroxide for reactive resins for use by way of example for trafficway markings. There is generally a diluent, for example a phthalate, such as dibutyl phthalate, an oil, or another plasticizer admixed with the peroxide in the second component. The cold plastic of the invention, as the entirety of the first and the second component, and also optionally of the third component, comprises from 0.1% by weight to 7% by weight, preferably from 0.5% by weight to 6% by weight, and very particularly preferably from 1% by weight to 5% by weight, of the initiator or of the mixture made of the initiator and of the diluent.

By virtue of the absence of halogen in the initiator system it is easily possible per se to achieve absence of halogen in the entire cold plastic and therefore in the trafficway marking. The markings of the invention are therefore preferred in terms of toxicological and environmental aspects over the systems which are described in the prior art and which rapidly withstand passage of traffic. Absence of halogen means that the cold plastic and the trafficway marking produced therefrom comprise less than 0.1% by weight, preferably less than 0.01% by weight, of halogens.

One particular embodiment of a redox initiator system for reactive resins is the combination of peroxides and accelerators, in particular amines. The following may be mentioned as examples of said amines: tertiary aromatically substituted amines, such as in particular N,N-dimethyl-p-toluidine, N,N-bis(2-hydroxyethyl)-p-toluidine, and N,N-bis(2-hydroxypropyl)-p-toluidine. The reactive resin of the invention can comprise up to 7% by weight, preferably up to 5% by weight, and very particularly preferably up to 3% by weight, of an accelerator.

In an alternative embodiment of a three-component system, the second component, for example a diluent, comprises the accelerator, and the initiator, e.g. the peroxide, is a constituent of the reactive resin of the invention. The third component again involves the glass beads and any coupling agents required.

The crosslinking agents are a decisive constituent of the reactive resin of the invention, in particular polyfunctional methacrylates, such as allyl (meth)acrylate. Particular preference is given to di- or tri(meth)-acrylates, e.g. 1,4-butanediol di(meth)acrylate, tetraethylene glycol di(meth)acrylate, triethylene glycol di(meth)acrylate, or trimethylolpropane tri (meth)acrylate. The proportion of crosslinking agents is significantly higher than in the prior art, and is from 13% by weight to 35% by weight, preferably from at least 20% by weight to at most 30% by weight. Surprisingly, it has been found that this relatively high proportion of crosslinking agent not only provides a high level of initial hardening but also, in combination with the other components, can give rapid suitability for passage of traffic over the trafficway marking which comprises the resin of the invention.

The urethane (meth)acrylates are a second decisive constituent of the reactive resins of the invention. For the purposes of this invention, these are compounds which have (meth)acrylate functionalities linked to one another by way of urethane groups. They are obtainable via the reaction of hydroxyalkyl (meth)acrylates with poly-isocyanates and polyoxyalkylenes which have at least two hydroxy functionalities. Instead of hydroxyalkyl (meth)acrylates it is also possible to use esters of (meth)acrylic acid with oxiranes, e.g. ethylene oxide or propylene oxide, or with corresponding oligo- or polyoxiranes. DE 199 02 685 gives an overview by way of example of urethane (meth)acrylates with functionality greater than 2. EBECRYL 210-5129 from UCB Chemicals is a commercially available example produced from polyols, isocyanates, and hydroxy-functional methacrylates. Urethane (meth)acrylates in a reactive resin increase flexibility, ultimate tensile strength, and tensile strain at break, without any major temperature-dependency. A surprising finding is that this affects the trafficway marking in two ways: the resistance of the marking to temperature change increases and, particularly surprisingly, it is possible to compensate for the disadvantages of a relatively high degree of crosslinking caused by the relatively high crosslinking agent content, in terms of embrittlement and adhesion to the trafficway surface, or even to achieve improvements over cold plastics of the prior art in respect of said disadvantages. The concentration of the urethane (meth)acrylates required in the reactive resin for this purpose is relatively high for trafficway markings. The reactive resin of the invention comprises from 5% by weight to 30% by weight, preferably from 10% by weight to 20% by weight, of the urethane (meth)acrylates described.

The monomers present in the reactive resin involve compounds selected from the group of the (meth)acrylates, such as alkyl (meth)acrylates of straight-chain, branched, or cycloaliphatic alcohols having from 1 to 40 carbon atoms, e.g. methyl (meth)acrylate, ethyl (meth)acrylate, n-butyl (meth) acrylate, 2-ethylhexyl (meth)acrylate, stearyl (meth)acrylate, lauryl (meth)acrylate; aryl (meth)acrylates, e.g. benzyl (meth)acrylate; mono (meth)acrylates of ethers, of polyethylene glycols, or of polypropylene glycols, or mixtures of these, having from 5 to 80 carbon atoms, e.g. tetrahydrofurfuryl (meth)acrylate, methoxy(m)ethoxyethyl (meth)acrylate, benzyloxymethyl (meth)acrylate, 1-ethoxybutyl (meth) acrylate, 1-ethoxyethyl (meth)acrylate, ethoxymethyl (meth) acrylate, poly(ethylene glycol)methyl ether (meth)acrylate, and poly(propylene glycol)methyl ether (meth)acrylate.

Other suitable constituents of monomer mixtures are additional monomers having a further functional group, examples being α,β-unsaturated mono- or dicarboxylic acids, such as acrylic acid, methacrylic acid, or itaconic acid; esters of acrylic acid or methacrylic acid with dihydric alcohols, e.g. hydroxyethyl (meth)acrylate or hydroxypropyl (meth)acrylate; acrylamide or methacrylamide; or dimethylaminoethyl (meth)acrylate. Examples of other suitable constituents of monomer mixtures are glycidyl (meth)acrylate and silyl-functional (meth)acrylates.

The monomer mixtures can also comprise, alongside the (meth)acrylates described above, other unsaturated monomers which are copolymerizable by means of free-radical polymerization with the abovementioned (meth)acrylates. Among these are inter alia 1-alkenes and styrenes. The specific choice of the proportion and constitution of the poly (meth)acrylate advantageously depends on the desired technical function.

The proportion of monomer in the reactive resin here is from 20% by weight to 50% by weight, preferably from 30% by weight to 40% by weight.

The systems known as MO-PO systems also comprise, alongside the monomers listed, polymers which for the purposes of this patent are termed prepolymer in order to render them more easily distinguishable, preferably polyesters or poly(meth)acrylates. These are used to achieve improvement in polymerization properties, mechanical properties, adhesion to the substrate, and also with a view to the optical requirements placed upon the resins. The proportion of prepolymer in the reactive resin here is from 10% by weight to 30% by weight, preferably from 15% by weight to 25% by weight. Not only the polyesters but also the poly(meth)acrylates can have additional functional groups for coupling purposes or for purposes of copolymerization in the crosslinking reaction, for example taking the form of double bonds. However, it is preferable that, with a view to better stability of color of the trafficway marking, the prepolymers have no double bonds.

Said poly(meth)acrylates are generally composed of monomers identical with those previously listed in relation to the monomers in the resin system. They can be obtained via solution polymerization, emulsion polymerization, suspension polymerization, bulk polymerization, or precipitation polymerization, and are added in pure form to the system. Said polyesters are obtained in undiluted form via polycondensation or ring-opening polymerization, and are composed of the units known for these applications.

Auxiliaries and additives that can also be used are chain transfer agents, plasticizers, paraffins, stabilizers, inhibitors, waxes, and/or oils.

The paraffins are added in order to prevent inhibition of the polymerization reaction by the oxygen in air. To this end it is possible to use a plurality of paraffins with different melting points, in different concentrations.

Chain transfer agents used can comprise any of the compounds known from free-radical polymerization reactions. It is preferable to use mercaptans, such as n-dodecyl mercaptan.

Preferred plasticizers used are esters, polyols, oils, or low-molecular-weight polyethers, or phthalates.

The following can also be added to the formulations for trafficway markings: dyes, glass beads, fine and coarse fillers, wetting agents, dispersing agents, and leveling aids, UV stabilizers, antifoams, and rheology additives. When the formulations are used in the application sector of trafficway marking or surface marking, auxiliaries and additives added preferably comprise dyes. Particular preference is given to white, red, blue, green, and yellow inorganic pigments, and white pigments such as titanium dioxide are particularly preferred.

In formulations for trafficway markings and surface markings it is preferable to use glass beads as reflectors.

The diameters of the commercially available glass beads used are from 10 µm to 2000 µm, preferably from 50 µm to 800 µm. The glass beads can be provided with a coupling agent to improve usage properties and adhesion. The glass beads can preferably be silanized.

It is also possible to add one or more mineral fillers in fine or coarse form to the formulation. These materials also serve to reduce skidding and are therefore in particular used to improve grip, and for additional coloring of the trafficway marking. Fine fillers used come from the group of the calcium carbonates, barium sulfates, powdered or other quartzes, precipitated and fumed silicas, pigments, and cristobalites. Coarse fillers used are quartzes, cristobalites, corundums, and aluminum silicates.

Conventional UV stabilizers can also be used. The UV stabilizers are preferably selected from the group of the benzophenone derivatives, benzotriazole derivatives, thioxanthonate derivatives, piperidinol carboxylic ester derivatives, or cinnamic ester derivatives.

From the group of the stabilizers and inhibitors it is preferable to use substituted phenols, hydroquinone derivatives, phosphines and phosphites.

The following components can also optionally be present in formulations for trafficway marking:
wetting agents, dispersing agents, and leveling aids, these preferably being selected from the group of the alcohols, hydrocarbons, glycol derivatives, derivatives of glycolic esters, of acetic esters, and of polysiloxanes, or from the group of the polyethers, polysiloxanes, polycarboxylic acids, and saturated and unsaturated polycarboxylic aminoamides.

Rheology additives used are preferably polyhydroxycarboxamides, urea derivatives, salts of unsaturated carboxylic esters, alkylammonium salts of acidic derivatives of phosphoric acid, ketoximes, amine salts of p-toluenesulfonic acid, amine salts of sulfonic acid derivatives, and also aqueous or organic solutions or mixtures of the compounds. Rheology additives that have been found to be particularly suitable are those based on fumed or precipitated, and also optionally silanized, silicas with BET surface area of from 10-700 nm$^2$/g.

Antifoams are preferably selected from the group of the alcohols, hydrocarbons, paraffin-based mineral oils, glycol derivatives, and derivatives of glycolic esters, of acetic esters, and of polysiloxanes.

This freedom of formulation shows that the reactive resin of the invention and the cold plastic of the invention, comprising the reactive resin, can be formulated, and can use additives, in the same way as any established cold plastic of the prior art. With this, the following are also at least as good as in systems of the prior art: abrasion resistance, lifetime, whiteness, pigmentation, and grip. Surprisingly, however, it has been found that lifetime and adhesion are actually better than described in the prior art, because of the particular mechanical properties explained and the additional adhesion-promoting properties of the urethane (meth)acrylates.

As far as the shelf life of the reactive resin is concerned, this is also correspondingly at least comparable with the prior art.

It is also possible to optimize the system in relation to the substrate to be coated, by selection of suitable monomers, prepolymers, and/or adhesion promoters. The systems of the invention are accordingly capable of flexible optimization for the marking of asphalt surfaces, concrete surfaces, or natural stone surfaces.

The systems of the invention are also versatile in relation to application technology. The reactive resins of the invention or cold plastics of the invention can be applied either by the spraying method or else by the extrusion method.

The examples provided below are provided for more detailed illustration of the present invention, but do not restrict the invention to the features disclosed therein.

INVENTIVE EXAMPLES

Dimensional stability and stability of adhesion is measured to DAfStb-RiLi 01/DIN EN 1542 99 and to DIN EN 1436.

Inventive Example 1

Production of the Polyfunctional Urethane Methacrylate (Isocyanate-MA)

0.2 mol of ®Voranol CP 6055 (DOW), 0.4 mol of hydroxyethyl methacrylate (HEMA), 500 ppm of 2,6-di-tert-butyl-4-methyl-phenol, based on the predicted amount of the final product, 0.46 mol of IPDI (isophorone diisocyanate) and $2*10^{-3}$ mol of dibutyltin dilaurate (DBTDL) are used as initial charge in a round-bottomed flask with reflux condenser, thermometer, stirrer, and dropping funnel, and are stirred at room temperature for one hour. The temperature of the mixture is then raised continuously to 80° C. within one hour. The temperature is then kept at 80° C. for about 5 hours until the content of isocyanate groups has fallen below 0.1%, with, above the mixture, a nitrogen-oxygen mixture using about 7% by volume of oxygen. If, despite prolonged continued reaction time, the isocyanate content fails to decrease below 0.1%, residual amounts of isocyanate groups are reacted with a stoichiometric amount of HEMA. 500 ppm of 2-tert-butyl-4,6-dimethylphenol, based on the total mass of the final product, are then added to the mixture. This reaction gives a mixture of urethane methacrylates, and this mixture can be used in further reactions without further work-up.

Inventive Example 2

PW (parts by weight) of the following reactive resin constituted as follows:

| | |
|---|---|
| Methyl methacrylate | 11.4 |
| Triethylene glycol dimethacrylate | 13 |
| Butyl diglycol methacrylate | 21 |
| 1,4-Butanediol dimethacrylate | 13 |
| Degalan LP 64/12 * | 3.5 |
| Degalan LP 66/02 * | 15 |
| Isocanate-MA of Inv. Ex. 1 | 12 |
| Diisopropyl-para-toluidine | 2.5 |
| Dimethyl-para-toluidine | 0.3 |
| Paraffin 5603 | 1 |
| Dibutyl maleate | 5 |
| Hydroxypropyl methacrylate | 2 |

* in each case purchased from Evonik Röhm GmbH

Properties:

| P971/025 | | Measurement 1 | Measurement 2 |
|---|---|---|---|
| Brookfield DV II viscosity | [mPas] | 651 | 433 |
| ALZ ISO 6 mm | [s] | 44 | 34 |
| Pot life* | [min.] | 2 | 2 |
| Tmax* | [min.] | 5 | 2.5 |
| Tmax* | [° C.] | 125 | 130 |
| O test* | [min.] | 3.5 | 3.5 |
| Shore D | | 49 | 51 |

*on addition of 2% of benzoyl peroxide

The composition is further processed with 10 PW of titanium dioxide (TR 92), 54.6 PW of fine filler (Omyacarb 15 GU), 0.3 PW of a dispersing agent (TEGO® Dispers 670) and 0.1 PW of rheology additive (Byk 410), with dispersion, to give a trafficway marking paint.

The resin is used as initial charge here, a portion of the rheology additive is incorporated by dispersion for 5 minutes, and in the next step the dispersing agent is likewise incorporated by dispersion for 5 minutes, and then the titanium dioxide and the fine filler are respectively incorporated by dispersion for a further 10 minutes.

Finally, the remainder of the dispersing agent is incorporated.

a. 2% of dibenzoyl peroxide are added, with stirring, to this sprayable cold plastic composition, and the material is applied at a thickness of 700 μm by way of an airless spray machine at 23° C. 450 g/m² of Megalux 600-800 3:1 MKT18 (Swarco, comprising corundum in a ratio of 3:1) are subsequently scattered as reflectors/grip aids onto the material.

b. at 5° C.

c. at 40° C.

The formulation properties of the sprayable cold plastic (pot and hardening times) are found in the following table:

| Viscosity | Spread dimension | Surface temperature | Pot life | O test* |
|---|---|---|---|---|
| Brookfield DV II | | | | |
| 3700 mPas | 9 cm | 5° C. | 120 s | 4.5-5 min. |
| | | 23° C. | 60 s | 3-3.5 min. |
| | | 40° C. | 40 s | 2.5-3 min. |

*with 2% by weight of benzoyl peroxide d. on addition of 4% of dibenzoyl peroxide at 23° C., the pot life achieved is 45 seconds and the hardening time achieved is 2 minutes.

| 5° C. hardening tests (with 2% of BPO) (inv. ex. 2 b) | |
|---|---|
| Pot life min. | 2' |
| O test min. | 4.5-5' |
| Shore D | 60 |

| 23° C. hardening tests (with 2% of BPO) | | with 4% of BPO |
|---|---|---|
| Pot life | 50-60 sec. | 45 sec. |
| O test | 3-3.5' | 2 min. |
| Shore D | 62 | |
| Whiteness | 90.71 | 89.97 |
| Standard color coordinates | X = 0.3197 | X = 0.3204 |
| | Y = 0.3368 | Y = 0.3389 |

| 40° C. hardening tests (with 2% of BPO) | |
|---|---|
| Pot life min. | about 40 sec. |
| O test min. | 2.5-3' |
| Shore D | 62 |
| Whiteness | 89.43 |
| Standard color coordinates | X = 0.3213 |
| | Y = 0.3382 |

Re inventive example a.:
Initial values to DIN EN 1436
Grip: 58 SRT units
Night visibility, dry: 320 [mcd/m²lx]
Luminance coefficient Qd=305 [mcd/m²lx]

Comparative Examples

Comparative examples using sprayable cold plastics for road marking are found by way of example in WO 2008/

022861. The examples listed in that document reveal hardening times of from 17 min. to 20 min. at temperatures of 5° C.; 8 min. at 23° C., and from 9 min. to 12 min. at 45° C.

Embodiments of the Invention

1. A reactive resin for the marking of trafficways based on (meth)acrylates, characterized in that the reactive resin has the following ingredients:
   from 20% by weight to 30% by weight of crosslinking agents,
   from 30% by weight to 40% by weight of monomers,
   from 10% by weight to 20% by weight of urethane (meth)acrylates,
   from 15% by weight to 25% by weight of prepolymers,
   from 0% by weight to 5% by weight of accelerators, and optionally other auxiliaries.
2. The reactive resin of embodiment 1, characterized in that the reactive resin is halogen-free, and that the reactive resin has the following ingredients:
   from 20% by weight to 30% by weight of dimethacrylates,
   from 30% by weight to 40% by weight of (meth)acrylates and/or components copolymerizable with (meth)acrylates,
   from 10% by weight to 20% by weight of urethane (meth)acrylates,
   from 15% by weight to 25% by weight of poly(meth)acrylates,
   from 0% by weight to 5% by weight of accelerators, and
   optionally other auxiliaries.
3. A cold plastic, characterized in that the cold plastic has the following components:
   from 15% by weight to 45% by weight of a reactive resin of embodiment 1 or 2,
   from 1% by weight to 5% by weight of a mixture comprising one or more initiators,
   from 7% by weight to 15% by weight of an inorganic pigment, preferably titanium dioxide, and
   from 50% by weight to 60% by weight of mineral fillers.
4. The cold plastic of embodiment 3, comprising a reactive resin of embodiment 1 or 2, characterized in that
   the initiator involves a peroxide and the accelerator involves an amine.
5. The cold plastic of embodiment 4, characterized in that the peroxide involves dilauroyl peroxide and/or dibenzoyl peroxide and the amine involves a tertiary, aromatically substituted amine.
6. The cold plastic of any of embodiments 3 to 5, characterized in that
   the peroxide is a constituent of the reactive resin of embodiment 1 or 2, and
   that the accelerator is not a constituent of the reactive resin, but instead is a separate component of the cold plastic.
7. The cold plastic of any of embodiments 3 to 6, characterized in that
   the components are mixed prior to or during application on a trafficway surface.
8. The cold plastic of any of embodiments 3 to 7, characterized in that
   traffic can resume passage over a trafficway marking composed of said cold plastic 5 min., preferably 2 min., after application on the trafficway surface.
9. The use of a reactive resin of embodiment 1 or 2 for the production of trafficway markings that rapidly withstand passage of traffic.
10. The use of a cold plastic of any of embodiments 3 to 8 for the production of trafficway markings that rapidly withstand passage of traffic.
11. The use of a cold plastic of embodiment 10 for the production of trafficway markings that rapidly withstand passage of traffic, characterized in that glass beads are added prior to, during or directly after the application of the cold plastic on the trafficway surface.
12. A method of producing a trafficway marking, the method comprising:
    applying a cold plastic to a trafficway surface, to obtain the trafficway marking,
    wherein, in less than 5 minutes after the applying, the trafficway marking can withstand the passage of traffic, and
    said cold plastic is a cold plastic comprising:
    from 15% to 45% by weight of a reactive resin;
    from 1% to 5% by weight of a mixture comprising an initiator;
    from 7% to 15% by weight of an inorganic pigment; and
    from 50% to 60% by weight of a mineral filler wherein said reactive resin, comprises:
    from 20% to 30% by weight of at least one crosslinking agent selected from the group consisting of allyl (meth)acrylate, 1,4-butanediol di(meth)acrylate, tetraethylene glycol di(meth)acrylate, triethylene glycol di(meth)acrylate, and trimethylolpropane tri(meth)acrylate;
    from 30% to 40% by weight of a monomer component comprising at least one monomer selected from the group consisting of an alkyl (meth)acrylate of an alcohol having from 1 to 40 carbon atoms, an aryl (meth)acrylate, a mono (meth)acrylate of an ether having from 5 to 80 carbons, an $\alpha,\beta$-unsaturated monocarboxylic acid, an $\alpha,\beta$-unsaturated dicarboxylic acid, a hydroxyalkyl (meth)acrylate, a (meth)acrylamide, an amino alkyl (meth)acrylate, glycidyl (meth)acrylate, and a silyl-functional (meth)acrylate;
    from 10% to 20% by weight of a urethane (meth)acrylate, wherein the urethane (meth)acrylate comprises at least two (meth)acrylate functions linked together with a urethane group;
    from 15% to 25% by weight of a prepolymer comprising at least one selected from the group consisting of a polyester and a poly(meth)acrylate;
    from above 0% to 5% by weight of an accelerator, which is a tertiary, aromatically substituted amine; and
    optionally, an auxiliary.
13. The method of embodiment 12, wherein, in less than 2 minutes after the applying, the trafficway marking can withstand the passage of traffic
14. The method of embodiment 12, further comprising, prior to, during, or after the applying:
    adding glass beads to the cold plastic.
15. The method of embodiment 12, wherein said cold plastic comprises
    from 15% to 45% by weight of the reactive resin;
    from 1% to 5% by weight of a mixture comprising an initiator;
    from 7% to 15% by weight of an inorganic pigment; and
    from 50% to 60% by weight of a mineral filler, wherein the accelerator is present in an amount of from above 0% to 5% by weight of and is a tertiary, aromatically substituted amine.

16. The method of embodiment 12, wherein said cold plastic comprises
from 20% to 30% by weight of at least two crosslinking agents selected from the group consisting of allyl (meth)acrylate, 1,4-butanediol di(meth)acrylate, tetraethylene glycol di(meth)acrylate, triethylene glycol di(meth)acrylate, and trimethylolpropane tri(meth)acrylate.
17. The method of embodiment 12, wherein said cold plastic comprises from 20% to 30% by weight of a mixture of 1,4-butanediol dimethacrylate and triethylene glycol dimethacrylate.
18. The method of embodiment 12, wherein the tertiary, aromatically substituted amine is selected from the group consisting of N,N-dimethyl-p-toluidine, N,N-bis(2-hydroxyethyl)-p-toluidine, N,N-bis(2-hydroxypropyl)-p-toluidine, and a combination thereof.
19. The method of embodiment 12, wherein the tertiary, aromatically substituted amine is selected from the group consisting of N,N-dimethyl-p-toluidine, N,N-bis(2-hydroxyethyl)-p-toluidine, N,N-bis(2-hydroxypropyl)-p-toluidine, and a combination thereof.

What is claimed is:

1. A method of producing a trafficway marking, the method comprising:
applying a cold plastic to a trafficway surface, to obtain the trafficway marking,
wherein, in less than 5 minutes after the applying, the trafficway marking can withstand the passage of traffic, and
said cold plastic is a cold plastic comprising:
from 15% to 45% by weight of a reactive resin;
from 1% to 5% by weight of a mixture comprising an initiator;
from 7% to 15% by weight of an inorganic pigment; and
from 50% to 60% by weight of a mineral filler
wherein
said reactive resin, comprises:
from 20% to 30% by weight of at least one crosslinking agent selected from the group consisting of allyl (meth)acrylate, 1,4-butanediol di(meth)acrylate, tetraethylene glycol di(meth)acrylate, triethylene glycol di(meth)acrylate, and trimethylolpropane tri(meth)acrylate, with the proviso that the lower limit of said at least one crosslinking agent is 6% by weight, relative to the amount of the cold plastic, when the amount of reactive resin in the cold plastic is from 15 to 30% by weight.
from 30% to 40% by weight of a monomer component comprising at least one monomer selected from the group consisting of an alkyl (meth)acrylate of an alcohol having from 1 to 40 carbon atoms, an aryl (meth)acrylate, a mono (meth)acrylate of an ether having from 5 to 80 carbons, an α,β-unsaturated monocarboxylic acid, an α,β-unsaturated dicarboxylic acid, a hydroxyalkyl (meth)acrylate, a (meth)acrylamide, an amino alkyl (meth)acrylate, glycidyl (meth)acrylate, and a silyl-functional (meth)acrylate;
from 10% to 20% by weight of a urethane (meth)acrylate, wherein the urethane (meth)acryalate comprises at least two (meth)acrylate functions linked together with a urethane group;
from 15% to 25% by weight of a prepolymer comprising at least one selected from the group consisting of a polyester and a poly(meth)acrylate;
from above 0% to 5% by weight of an accelerator, which is a tertiary, aromatically substituted amine; and
optionally, an auxiliary.

2. The method of claim 1, wherein, in less than 2 minutes after the applying, the trafficway marking can withstand the passage of traffic.

3. The method of claim 1, further comprising, prior to, during, or after the applying:
adding glass beads to the cold plastic.

4. The method of claim 1, wherein said cold plastic comprises
from 15% to 45% by weight of the reactive resin;
from 1% to 5% by weight of a mixture comprising an initiator;
from 7% to 15% by weight of titanium dioxide; and
from 50% to 60% by weight of a mineral filler, wherein
the accelerator is present in an amount of from above 0% to 5% by weight of and is a tertiary, aromatically substituted amine.

5. The method of claim 1, wherein said cold plastic comprises
from 20% to 30% by weight of at least two crosslinking agents selected from the group consisting of allyl (meth)acrylate, 1,4-butanediol di(meth)acrylate, tetraethylene glycol di(meth)acrylate, triethylene glycol di(meth)acrylate, and trimethylolpropane tri(meth)acrylate.

6. The method of claim 1, wherein said cold plastic comprises from 20% to 30% by weight of a mixture of 1,4-butanediol dimethacrylate and triethylene glycol dimethacrylate.

7. The method of claim 1, wherein the tertiary, aromatically substituted amine is selected from the group consisting of N,N-dimethyl-p-toluidine, N,N-bis(2-hydroxyethyl)-p-toluidine, N,N-bis(2-hydroxypropyl)-p-toluidine, and a combination thereof.

8. The method of claim 1, wherein the tertiary, aromatically substituted amine is selected from the group consisting of N,N-dimethyl-p-toluidine, N,N-bis(2-hydroxyethyl)-p-toluidine, N,N-bis(2-hydroxypropyl)-p-toluidine, and a combination thereof, present in an amount of from above 0% to 3% by weight.

* * * * *